US006775128B2

(12) United States Patent
Leitao

(10) Patent No.: US 6,775,128 B2
(45) Date of Patent: Aug. 10, 2004

(54) PROTECTIVE COVER SLEEVE FOR LAPTOP COMPUTER SCREENS

(76) Inventor: Julio Leitao, 217 W. 106 St., #1A, New York, NY (US) 10025-3664

( * ) Notice: Subject to any disclaimer, the term of this patent is extended or adjusted under 35 U.S.C. 154(b) by 0 days.

(21) Appl. No.: 10/263,790

(22) Filed: Oct. 3, 2002

(65) Prior Publication Data

US 2004/0066613 A1 Apr. 8, 2004

(51) Int. Cl.⁷ ................................................. H05K 5/03
(52) U.S. Cl. ........................ 361/681; 361/683; 206/701
(58) Field of Search ................................. 361/683, 681, 361/686, 724, 679; 206/320, 701, 576, 591, 592, 593, 594

(56) References Cited

U.S. PATENT DOCUMENTS

| D237,755 S | 11/1975 | Ray ........................... D87/1 R |
| 5,002,184 A | 3/1991 | Lloyd .......................... 206/305 |
| 5,025,921 A | 6/1991 | Gasparaitis et al. ......... 206/320 |
| 5,295,089 A * | 3/1994 | Ambasz ....................... 361/681 |
| 5,325,970 A | 7/1994 | Dillon et al. ................ 206/576 |
| 5,485,922 A | 1/1996 | Butcher ....................... 206/576 |
| 5,607,054 A | 3/1997 | Hollingsworth ............. 206/320 |
| 5,682,182 A | 10/1997 | Tsubosaka ................... 345/173 |
| 5,775,497 A | 7/1998 | Krulik ......................... 206/320 |
| 5,931,297 A | 8/1999 | Weill et al. ................. 206/320 |
| 6,003,052 A | 12/1999 | Yamagata .................... 708/100 |
| 6,132,367 A * | 10/2000 | Adair .......................... 600/101 |
| 6,223,896 B1 | 5/2001 | Bell et al. .................... 206/320 |
| 6,266,240 B1 | 7/2001 | Urban et al. ................. 361/686 |
| 6,267,236 B1 | 7/2001 | Seok .......................... 206/320 |

* cited by examiner

Primary Examiner—Dean A. Reichard
Assistant Examiner—Carmelo Oliva
(74) Attorney, Agent, or Firm—Alfred M. Walker

(57) ABSTRACT

A hollow sleeve cover covers only the top panel of a laptop computer having the LCD screen, in the folded closed position, thereby separating the finger operable keyboard from the sensitive computer screen. The cover is made of a soft flexible fabric type material, such as ULTRA SUEDE or other non woven suede-like synthetic fabrics, with microfibers, which are impregnated with synthetic resins, shamcloth, moleskin, eyeglass cleaning cloth, made of a weave of nylon and polyester, or other micro polyester materials which do not damage the sensitive LCD screen. Generally rectangular in shape and conforming to the shape of the panel of the laptop computer containing the LCD screen, the cover is open at one bottom edge to permit its deployment over the hinged panel of the laptop computer.

15 Claims, 4 Drawing Sheets

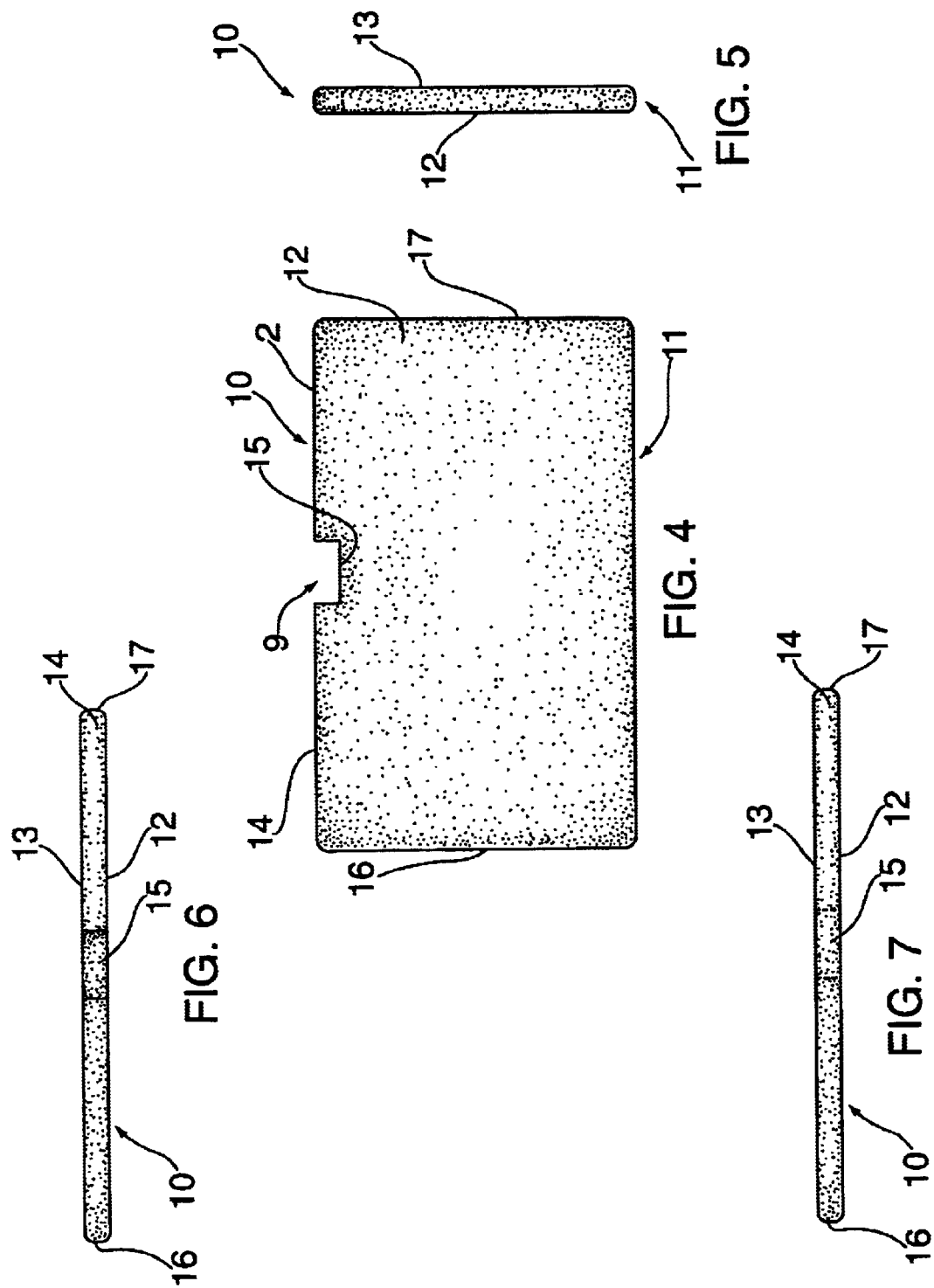

PROTECTIVE COVER SLEEVE FOR LAPTOP COMPUTER SCREENS

FIELD OF THE INVENTION

The present invention relates to protecting laptop computer screens.

BACKGROUND OF THE INVENTION

Portable laptop computers include a hinged body including two generally flattened portions joined together by a common hinge. One of the planar members includes the keyboard portion, which acts as a support base for the upright liquid crystal display (LCD) computer screen, which is exposed when a latch is released at the common edges opposite to the hinge.

A typical laptop computer is the "iBook" or "Powerbook" of Macintosh Computer Corporation. The iBook laptop computer has a liquid crystal display (LCD) computer screen within a thin generally flattened frame of either 12.1 or 14.1 inches in diagonal width. The 12.1 diagonal iBook has a width of 11.2 inches (28.5 cm), a depth of 9.06 inches (23.0 cm), a thickness of 1.35 inches (3.4 cm) and a weight of 4.9 pounds (2.2 kg). The 14.1 diagonal iBook has a width of 12.7 inches (32.3 cm), a depth of 10.2 inches (25.9 cm), a thickness of 1.35 inches (3.4 cm) and a weight of 5.99 pounds (2.7 kg).

Other laptop computers are similarly sized, and include screens of liquid crystal display (LCD) or other technologies, such as plasma screens.

When used, the keyboard has constant contact with the user's fingers, often with an accumulation of skin oils or grease from the user's repetitive finger contact with the keyboard.

In conjunction therewith, when the portable laptop computer is folded closed, the keyboard is adjacent to the screen in the folded position.

As a result, the accumulation of body skin oils and grease laden upon the keyboard can be transferable to the screen, which can stain or even scratch the screen.

Heretofore attempts have been made to enclose a laptop computer in a carry case cover.

An attempt to isolate the keyboard from the computer screen is shown in U.S. Pat. No. 5,931,297 of Weill, which describes a cumbersome three-part protective cover for a laptop computer to be used in hostile operating environments, such as outdoors or at a manufacturing site. The cover completely encloses a laptop computer with transparent plastic panels provided over the screen and the keyboard so that they can be seen while the laptop is used in the hostile environment. The cover includes three pockets arrayed as wings pivoting about a common edge. A central upright wing accommodates the panel of the laptop computer holding the computer screen. A forward generally horizontally extending front panel holds the bottom keyboard base portion of the laptop computer. Extending rearward in an opposite horizontal direction is the third pocket, which acts as an entryway portal for inserting the laptop computer into the protective cover. A watertight seal is provided at the entrance of this entry way pocket. The rearward entryway pocket can be folded up so as to be coextensive with the upright computer screen panel pocket, and held in place by straps with hook and loop or other type of fasteners.

The protective outdoors cover of Weill '297 is cumbersome to assemble, and requires feeding the closed laptop computer into the rearward entryway pocket wing, and then attempting to open the computer while it is inside of the entryway pocket wing and nimbly inserting the screen panel of the thus opened laptop computer into the upright middle pocket, while simultaneously inserting the horizontally oriented lower keyboard panel into the third, forwardly extending horizontal pocket wing. Then a separate manual step requires folding the rearward panel up against the back of the upright middle pocket, and securing this entryway panel onto the back of the upright middle pocket by straps or other fasteners.

Moreover, Weill '297 lacks a recess cutout providing access to a closeable latch of the laptop computer.

However, Weill '297 does not describe a simple thin cover sleeve which is simple to install upon a laptop computer panel having a computer screen, thereby covering only the panel having the computer screen therein, for use when the screen is adjacent to the keyboard in the closed position of non-use.

Among other related patents for carrying cases for laptop computers include U.S. Pat. Nos. 6,267,236 of Seok, 6,223,896 of Bell, 5,775,497 of Krulik, 5,607,054 of Hollingsworth, 5,485,922 of Butcher and 5,325,970 of Dillon, which disclose various outer covers for laptop computers, but not to separate the sensitive LCD screen from the finger-operable keyboard buttons. For example, Dillon '970 and Butcher '922 disclose hinged rigid covers. Krulik '497 and Hollingsworth '054 disclose hinged semi-rigid covers. Bell '896 discloses a flexible foam impact resistant cover for a portable laptop computer and Seok '236 discloses a semi-rigid u-shaped folder cover for a portable laptop computer.

However, other than Weill '297, the aforementioned patents do not separate the LCD screen from the adjacent keyboard buttons.

Among related patents for protecting screens of small, hand held "PALM" type computerized personal organizers include U.S. Pat. Nos. 6,266,240 of Urban, 6,003,052 of Yamagata, 5,682,182 of Tsubosaka and 5,002,184 of Lloyd. Tsubosaka '182 discloses a flat substrate plate which covers the LCD screen normally exposed at all times. Lloyd '184 discloses a hinged foam type case wherein the inside of a cover lays on top of the LCD screen of a hand held computer. Yamagata '052 discloses a retractable rollable cover for the exposed LCD screen of a portable hand held instrument. Urban '240 discloses a carry case which goes around the outside of a portable hand held PALM type personal organizer. However, Urban '240, Yamagata '052, Tsubosaka '182 and Lloyd '184 are configured to cover an unhinged handheld personal organizer with a constantly exposed LCD screen. They do not work to cover an inner LCD screen which is not exposed in a hinged laptop computer in the closed, folded position.

However, none of the aforesaid patents disclose a sleeve cover which covers only the top panel of a laptop computer having the LCD screen in the folded closed position, thereby separating the finger operable keyboard from the sensitive computer screen.

OBJECTS OF THE INVENTION

It is therefore an object of the present invention to provide a sleeve cover which covers only the top panel of a laptop computer having the LCD screen, in the folded closed position, thereby separating the finger operable keyboard from the sensitive computer screen.

It is also an object of the present invention to protect the sensitive LCD screen of a portable laptop computer from body skin oils and grease accumulated on the keyboard.

Other objects will become apparent from the following description of the present invention.

SUMMARY OF THE INVENTION

In keeping with these objects and others which may become apparent, the present invention is a hollow sleeve cover which covers only the top panel of a laptop computer having the LCD screen, in the folded closed position, thereby separating the finger operable keyboard from the sensitive computer screen.

The simple thin cover sleeve is simple to install upon a laptop computer panel having a computer screen, thereby covering only the panel having the computer screen therein, for use when the screen is adjacent to the keyboard in the closed position of non-use.

The hollow sleeve cover further includes a small recess cutout at a closed end thereof. The recess cutout provides access to a closeable latch of said laptop computer.

The cover is made of a soft flexible fabric type material, such as ULTRA SUEDE or other non woven suede-like synthetic fabrics, with microfibers, which are impregnated with synthetic resins, shamcloth, moleskin, eyeglass cleaning cloth, made of a weave of nylon and polyester, such as ULTRA CLEAR of Karlen Manufacturing, Inc. or other micro polyester materials which do not damage the sensitive LCD screen. Preferably the material is stretchable.

Generally rectangular in shape and conforming to the shape of the panel of the laptop computer containing the LCD screen, the cover is open at one bottom edge to permit its deployment over the hinged panel of the laptop computer. Two sides of the open sleeve are joined by a seam at a closed top edge opposite to the open bottom edge, which extends also along both sides between the seam and the open edge mouth of the sleeve.

For example, when stretched over the 12.1 diagonal iBook laptop computer, the sleeve is about the size of this iBook computer, such as being about 11.2 inches (28.5 cm) wide, 9.06 inches (23.0 cm) in depth with a thickness of 1.35 inches (3.4 cm). When stretched over the 14.1 diagonal inch iBook laptop computer, the sleeve is about the size of this iBook computer, such as being about 12.7 inches (32.3 cm) wide, 10.2 inches (25.9 cm) in depth with a thickness of 1.35 inches (3.4 cm).

A small recess cutout in the top closed seam edge is preferably provided to permit the closing of respective portions of the closing latch at the joinable edges of the laptop computer opposite to the common hinge of the laptop computer.

While the hollow sleeve can be used with most laptop computers, in the preferred embodiment it is used with a Macintosh iBook, a POWER BOOK or other Macintosh laptop computers.

The width of the seam can be adjusted in size to accommodate other laptop computers having varying widths at the hinge end.

Because of the thinness of the material of generally less than two millimeters, the laptop computer can be closed without the hollow sleeve material interfering with the tight fit of the closed panels of the laptop computer.

The hollow sleeve of the present invention enhances the maintenance of the LCD screen of a laptop computer by a thin, protective cover which slides over the panel of the laptop computer having the LCD screen therein.

The use of the protective sleeve provides the user with an opportunity to extend the working use of the LCD screen, and minimizes the need to clean the LCD screen from accumulated body skin oils or grease, with beneficial effects that are not possible with any other type of laptop computer cover.

This thin lightweight protective sleeve folds into a flat compact size when not in use.

BRIEF DESCRIPTION OF THE DRAWINGS

The present invention can best be understood in connection with the accompanying drawings. It is noted that the invention is not limited to the precise embodiments shown in drawings, in which:

FIG. 4 is a front elevational view of the protective sleeve for a computer screen of the present invention;

FIG. 5 is a right side elevational view thereof;

FIG. 6 is a top plan view thereof;

FIG. 7 is a bottom view thereof;

DETAILED DESCRIPTION OF THE INVENTION

Figure 1:
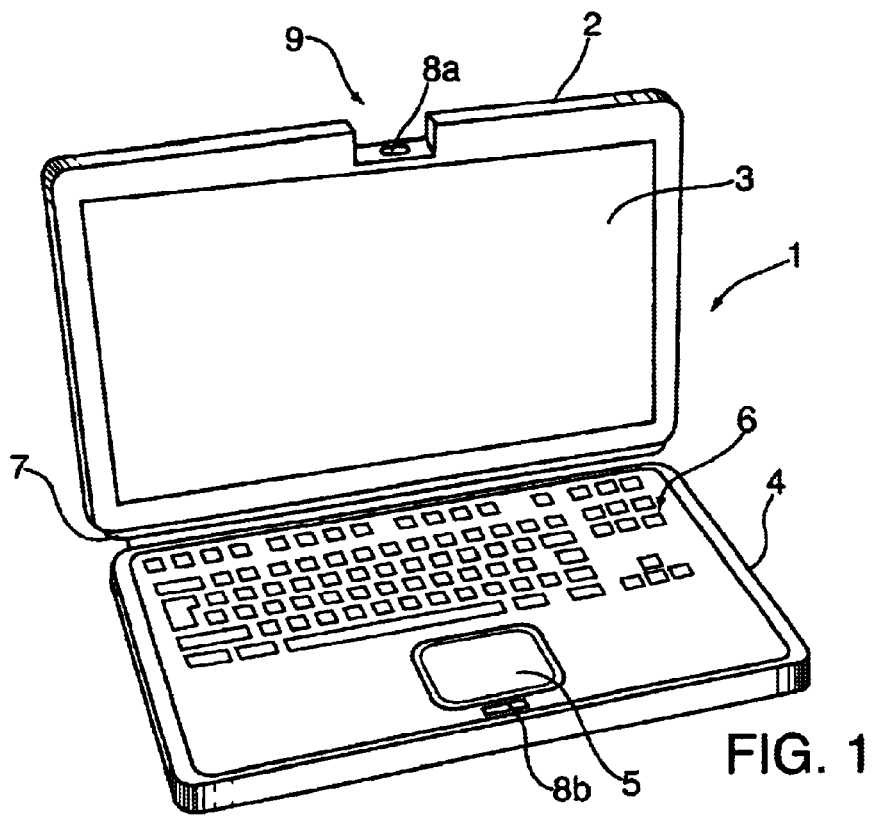
FIG. 1 is a perspective view of a prior art laptop computer.
Figure 2:
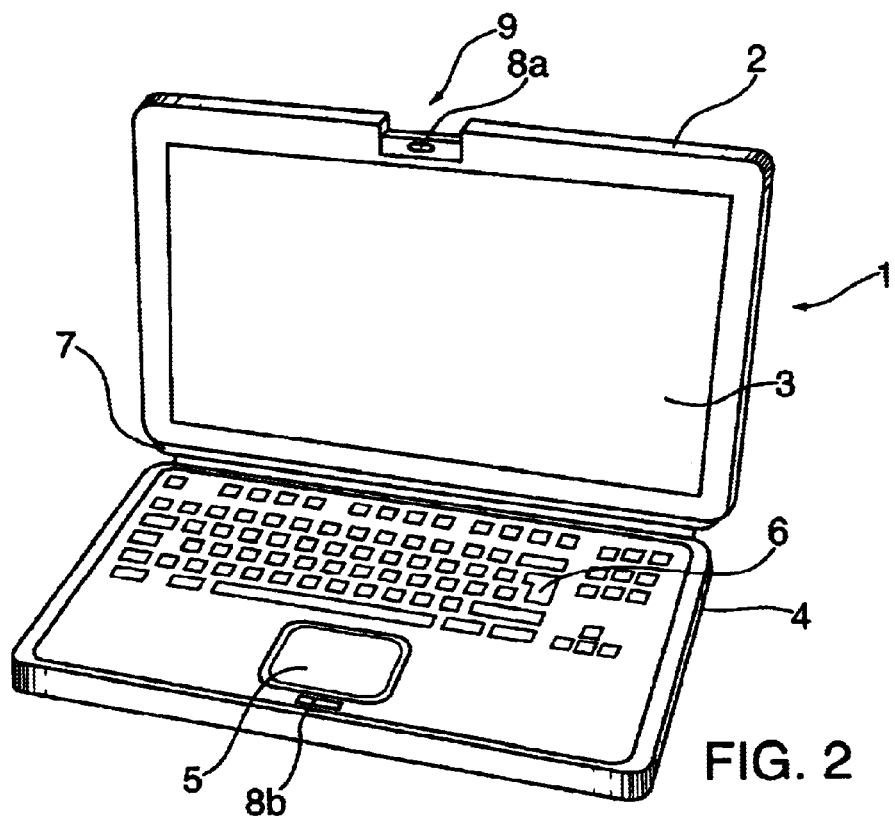
FIG. 2 is a right side perspective view of the prior art laptop computer.
Figure 3:
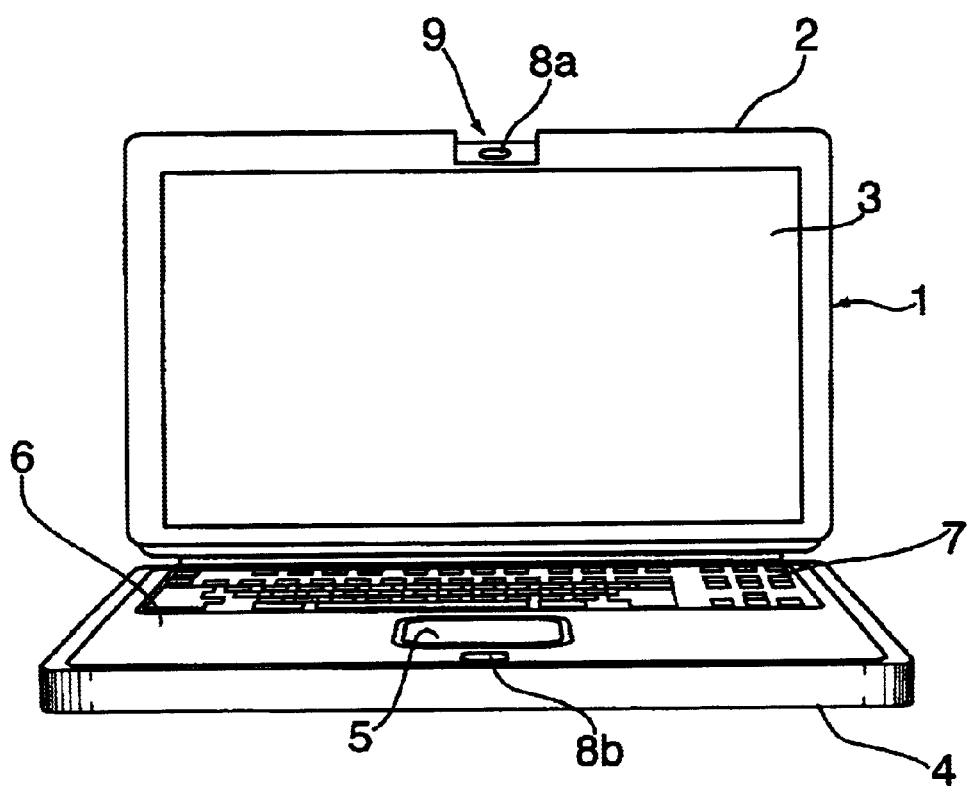
FIG. 3 is a front view thereof.
Figure 8:
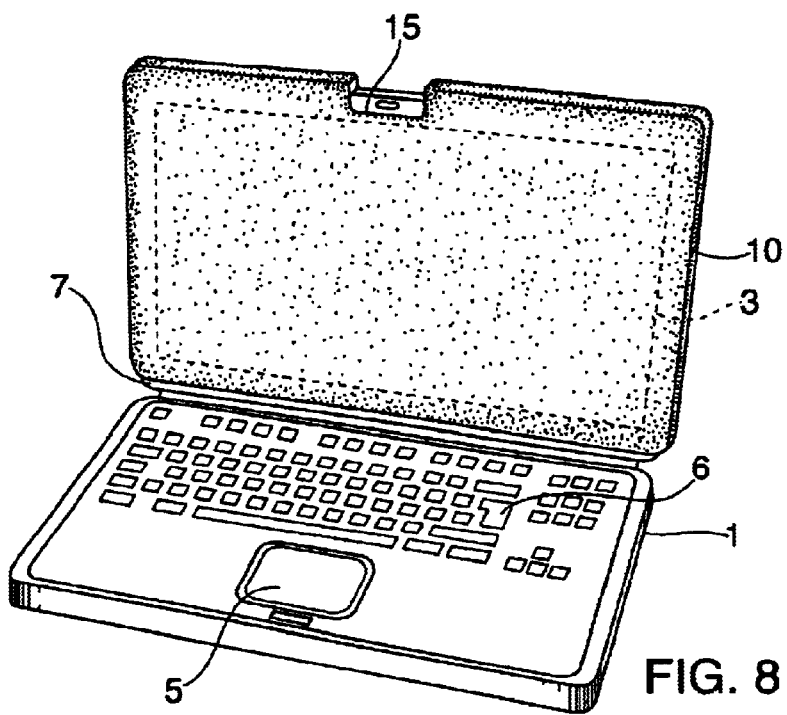
FIG. 8 is a right side perspective view of the protective sleeve of the present invention, shown installed over a computer screen of a laptop computer.
Figure 9:
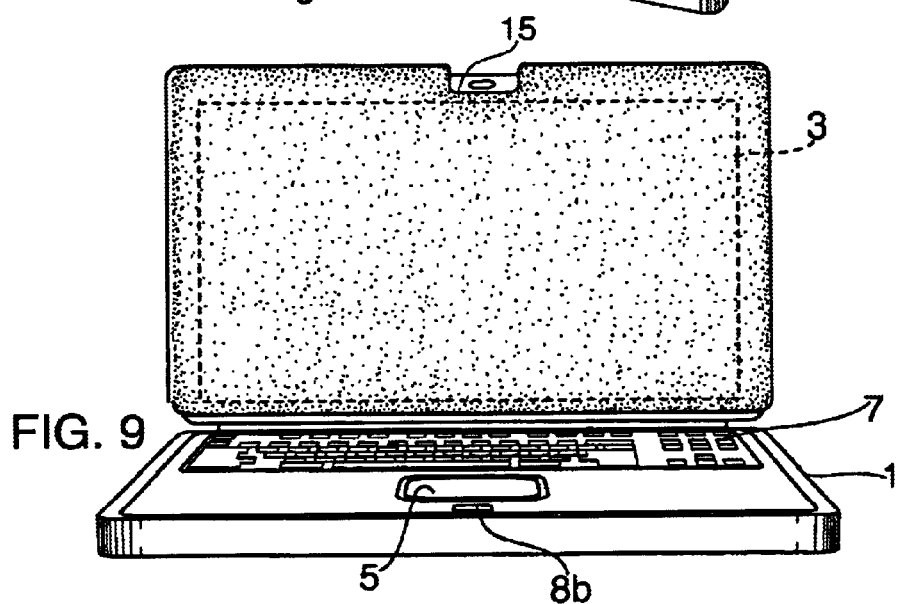
FIG. 9 is a front perspective view thereof.
Figure 10:
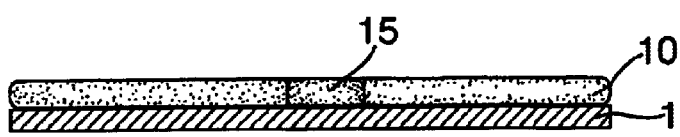
FIG. 10 is a bottom view, showing the sleeve of the present invention installed over a laptop computer screen; and, FIG. 11 is a close-up crossectional detail view, showing the sleeve separating the computer screen from the upwardly protruding keys of the keyboard of the laptop computer.
Figure 11:
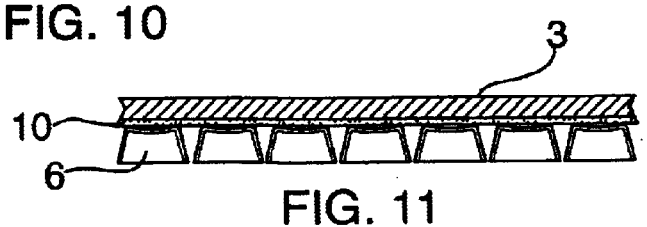

FIGS. 1–3 show a prior art laptop computer 1 with a top panel 2 having a computer screen 3, a bottom panel 4 having a mouse pad 5, a keyboard 6 with a collection of upwardly protruding finer operable key buttons, a hinged edge 7 and respective upper and lower latch closing members 8a and 8b. A recess cutout 9 is provided along a top edge of top panel 2 for access and release of respective upper and lower latch members 8a and 8b.

FIGS. 4–7 show protective cover sleeve 10, which is rectangular in shape and which conforms to the shape of the upper panel 2 of the laptop computer 1 containing the LCD screen 3.

The cover sleeve 10 is open at one bottom edge 11 to permit its deployment over the screen 3 of the upper panel 2 of the laptop computer 1. Two front and rear panels, such as front panel 12 and rear panel 13 of the open cover sleeve 10 are joined by a seam at a closed top edge 14 opposite to the open bottom edge 11. Front and rear panels 12 and 13 extend between the top edge 14 and the mouth of the open edge 11 of the cover sleeve 10. A recess cutout 15 is provided in the center of upper edge 14, to allow access to latch members 8a and 8b of laptop computer 1.

As shown in FIGS. 8–11, cover sleeve 10 is stretched over the laptop computer 1, covering and protecting computer screen 3 from contact with body oils or grease accumulated upon key buttons of keyboard 6 of laptop computer 1. When laptop 1 is folded, protective cover screen 10 is held between front panel 12 and rear panel 13 in a tight, stretched position over computer screen 3.

Because of the thinness of the material of cover sleeve 10 being generally less than two millimeters, front and rear panels 2 and 3 of the laptop computer 1 can be folded and closed together without the fabric material of cover sleeve 10 interfering with the tight fit of the closed panels 12 and 13 of the laptop computer 1.

In the foregoing description, certain terms and visual depictions are used to illustrate the preferred embodiment. However, no unnecessary limitations are to be construed by the terms used or illustrations depicted, beyond what is shown in the prior art, since the terms and illustrations are exemplary only, and are not meant to limit the scope of the present invention.

It is further known that other modifications may be made to the present invention, without departing the scope of the invention.

I claim:

1. A protective cover for and in combination with a screen of a laptop computer, wherein the laptop computer has two hinged panels joined by a common hinge, said laptop computer having a top panel having a computer screen therein, and a bottom panel having a mouse pad and a keyboard with a collection of upwardly protruding finger operable keyboard buttons, wherein in a closed, folded position the keyboard buttons rest adjacent to the computer screen, comprising:

a hollow sleeve cover consisting essentially of an unfolded flat front panel and an unfolded flat rear panel attached to each other on respective top, left and right edges, each of said front and rear panels terminating in a bottom edge forming a bottom opening through which said top panel of said computer extends, whereby said computer screen is completely covered by said sleeve cover;

a said front and rear panels of said hollow sleeve cover covering only said top panel of the laptop computer having the screen, said keyboard remaining uncovered;

said hollow sleeve cover thereby separating said finger operable keyboard of the laptop computer from the laptop computer screen, said hollow sleeve cover providing a grease and oil resistant barrier between said laptop computer screen and said finger operable keyboard of said laptop computer when said top and bottom panels are folded together; and said hollow sleeve cover having a recess to allow direct engagement of latch closing members on said top and bottom panels when said top and bottom panels are folded together.

2. The protective cover for a laptop computer screen as in claim 1 wherein said hollow sleeve cover is made of a thin, soft flexible fabric type material.

3. The protective cover for a laptop computer screen as in claim 2 wherein said thin, soft flexible fabric type material is selected from the group consisting of ULTRA SUEDE, a non woven suede-like synthetic fabric with microfibers impregnated with synthetic resins, shamcloth, moleskin, eyeglass cleaning cloth made of a weave of nylon and polyester, and a micro polyester.

4. The protective cover for a laptop computer screen as in claim 3 wherein said material is stretchable.

5. The protective cover for a laptop computer screen as in claim 2 wherein said material is less than two millimeters in thickness.

6. The protective cover for a laptop computer screen as in claim 1 wherein said hollow sleeve cover is rectangular in shape and conforms to the shape of the top panel of the laptop computer containing the computer screen.

7. The protective cover for a laptop computer screen as in claim 1 wherein said recess is located in a closed seam joining the top edges of said front and rear panels.

8. A method of protecting a screen of a laptop computer from deposits on a finger operable keyboard of said computer when said computer is not in use, said computer comprising top and bottom panels foldable from hinges along common edges and having engageable latching device members on edges of said panels opposite the hinged common edges, said screen being on said top panel and a keyboard on said bottom panel, said screen and keyboard facing each other, said method comprising the steps of:

with the laptop in the unfolded state, slipping over said top panel containing said screen a hollow sleeve cover completely covering said screen said cover consisting of an unfolded flat front panel and an unfolded flat rear panel attached to each other on respective top, left and right edges, each of said front and rear panels terminating in a bottom edge forming a bottom opening through which said top panel of said computer extends when said screen is covered, said top edge of said cover having a recess for the latching device member on said top panel; and folding together said top and bottom panels with the latching device members joining said top and bottom panels, said hollow sleeve cover thereby separating said keyboard of the laptop computer from the laptop computer screen and providing a grease and oil resistant barrier between said screen and said keyboard when said top and bottom panels are folded together.

9. A protective cover for and in combination with a screen of a laptop computer, wherein the laptop computer has two hinged panels joined by a common hinge, said laptop computer having a top panel having a computer screen therein, and a bottom panel having a mouse pad and a keyboard with a collection of upwardly protruding finger operable keyboard buttons, wherein in a closed, folded position the keyboard buttons rest adjacent to the computer screen, comprising:

a hollow sleeve cover consisting essentially of an unfolded flat front panel and an unfolded flat rear panel attached to each other on respective top, left and right edges, each of said front and rear panels terminating in a bottom edge forming a bottom opening through which said top panel of said computer extends, whereby said computer screen is completely covered by said sleeve cover;

said front and rear panels of said hollow sleeve cover covering only said top panel of the laptop computer having the screen, said keyboard remaining uncovered;

said hollow sleeve cover thereby separating said finger operable keyboard of the laptop computer from the laptop computer screen, said hollow sleeve cover providing a grease and oil resistant barrier between said laptop computer screen and said finger operable keyboard of said laptop computer when said top and bottom panels are folded together.

10. The protective cover for a laptop computer screen as in claim 9 wherein said hollow sleeve cover is made of a thin, soft flexible fabric type material.

11. The protective cover for a laptop computer screen as in claim 10 wherein said thin, soft flexible fabric type material is selected from the group consisting of ULTRA SUEDE, a non woven suede-like synthetic fabric with microfibers impregnated with synthetic resins, shamcloth, moleskin, eyeglass cleaning cloth made of a weave of nylon and polyester, and a micro polyester.

12. The protective cover for a laptop computer screen as in claim 11 wherein said material is stretchable.

13. The protective cover for a laptop computer screen as in claim 10 wherein said material is less than two millimeters in thickness.

14. The protective cover for a laptop computer screen as in claim 9 wherein said hollow sleeve cover is rectangular in shape and conforms to the shape of the top panel of the laptop computer containing the computer screen.

15. The protective cover for a laptop computer screen as in claim 9 further comprising a recess being located in a closed seam joining the top edges of said front and rear panels to permit closing of respective portions of said closing latch at respective joinable edges of the laptop computer opposite to the common hinge of the laptop computer.

* * * * *